June 2, 1964  R. J. KAVANAUGH  3,135,886
COUPLED SYNCHRONOUS MOTOR ASSEMBLY AND METHOD
OF COUPLING SYNCHRONOUS MOTORS
Filed Nov. 13, 1961
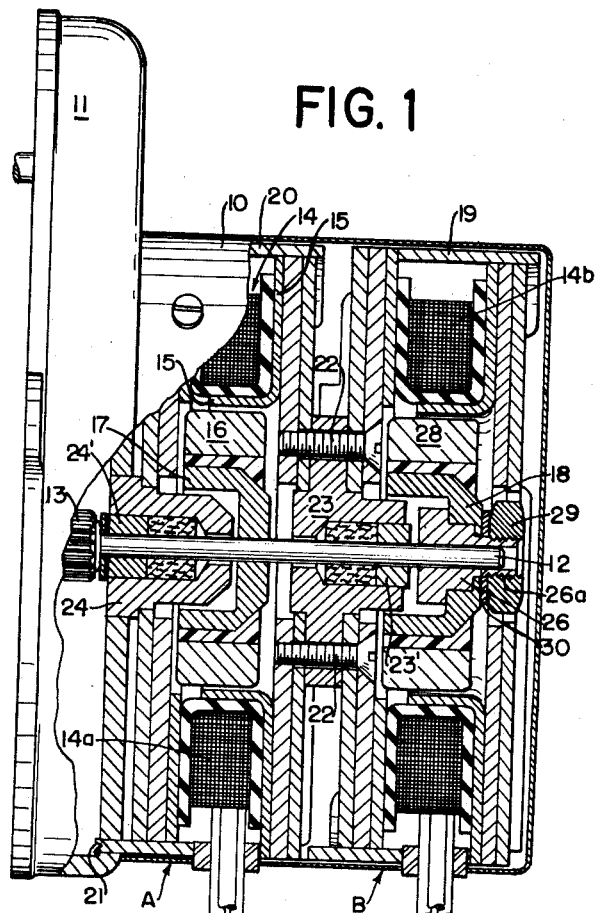
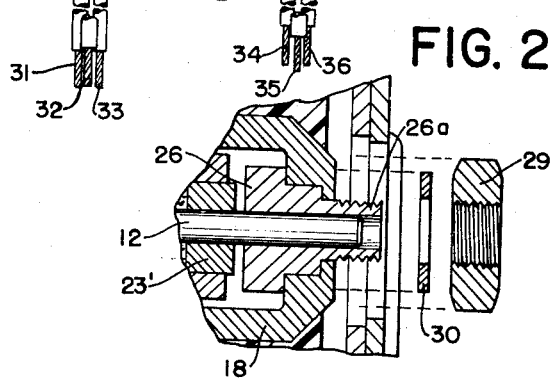
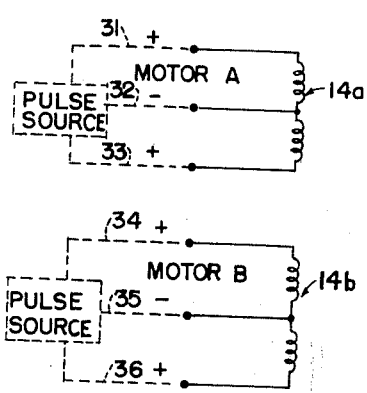
INVENTOR
RICHARD J. KAVANAUGH
BY
ATTORNEYS

United States Patent Office 3,135,886
Patented June 2, 1964

3,135,886
COUPLED SYNCHRONOUS MOTOR ASSEMBLY AND METHOD OF COUPLING SYNCHRONOUS MOTORS
Richard J. Kavanaugh, Bristol, Conn., assignor to Consolidated Electronics Industries Corp., Waterbury, Conn., a corporation of Delaware
Filed Nov. 13, 1961, Ser. No. 151,821
11 Claims. (Cl. 310—112)

The present invention relates in general to synchronous inductor motors, and more particularly to a novel method of coupling synchronous motors and to a novel and improved assembly of coupled synchronous motors.

Specifically, the invention relates to a method of coupling a plurality of synchronous motors in a manner to achieve precision polar alignment of the rotors and stators of the respective motors throughout the entire assembly. The invention is particularly applicable in connection with the coupling of synchronous motors having non-salient poles in one of the active motor components, although it is to be particularly understood that the usefulness of the invention is not limited to such motors.

In a typical inductor type synchronous motor, for example, there may be a large number of poles (e.g., 24) so that polar relationships are reversed with each few degrees of rotation. Thus, when mechanically coupling two or more such motors, slight angular misalignments in the polar relationships of the respective motors can seriously affect the operating effectiveness of the coupled assembly. Precision polar alignment is not required in all functions of a coupled synchronous motor assembly; however, it finds particular significance, indeed critical importance, in several applications, including the utilization of coupled, opposed synchronous motors as a bi-directional stepper motor or as an instantly reversible, high torque motor. For example, when two opposed, synchronous motors are coupled to bi-directionally index an output shaft in discrete, predetermined rotational steps, the direction of rotation depending upon which of the two opposed motors is energized by a pulsating source, it is essential that each pulse result in equal indexing or "stepping" of the output shaft. That is, the rotation of the output shaft with each pulse must always be the same, regardless of direction.

The quantitative amount of angular indexing per pulse of a typical synchronous motor is inversely proportional to the number of its poles. For example, in a typical 24-pole inductor type synchronous motor, the rotor will index 15 degrees per pulse as a result of changing the polarity of the stator poles, thereby causing the respective poles of the permanently magnetized rotor to be repelled by one set of stator poles and be attracted to adjacent, oppositely magnetized poles. However, if the rotor and stator of a 24-pole synchronous motor were not polarly aligned when initially energized by a pulse source, the rotor would move only from its initial, misaligned position to a position of polar alignment with the next stator pole, therefore indexing other than the desired 15 degrees.

When coupling a pair of motors with their rotors on a common shaft for bi-directional indexing, for example, the rotors are likely to be polarly misaligned relative to their stators. If such is the case, the first pulse to each motor, after each instance of switching to effect a reversal of direction, would result in an indexing of less than the desired 15 degrees, due to the rotor's intermediate location between stator poles rather than in its precise, polarly aligned position. As a matter of fact, it is possible, in certain cases of extreme polar misalignment, for the initial indexing of the shaft to be in a direction opposite to that expected or desired.

As will be understood, any significant polar misalignment of a pair of reversely coupled synchronous motors would render the assembly inoperative for use as a bi-directional stepper motor. And, similarly, polar misalignment of coupled motor assemblies would result in inoperativeness or substantial inefficiency of the assembly for other uses.

Heretofore, it has been impracticable and virtually impossible to achieve precise polar alignment of coupled motor assemblies by simple mechanical coupling of rotors, for the slightest errors, inherent in the techniques known to the art, will result in a polar misalignment. Moreover, and particularly in the case of motors having rotors with non-salient poles, no two rotors and stators have identical electromagnetic characteristics so that uniform mechanical alignment, for example, will not reliably achieve uniform and accurate polar alignment. These problems are obviated, in accordance with the invention, by effecting electromagnetic alignment of the several motors of an assembly prior to mechanically coupling the motors, and completing the mechanical coupling while the motors are electromagnetically held in the desired, precise polar alignment. This novel method of motor coupling eliminates unequal indexing or unequal "stepping" of a bi-directional stepper motor, for example, when oppositely rotating rotors have been coupled on a common shaft or coupled by any other mechanical means. Moreover, the present invention obviates the necessity of utilizing conventional phase-shifting circuitry, provides simpler, more foolproof operation, and reduces the cost of manufacture.

More specifically, one advantageous procedure, according to the invention, for aligning the magnetic poles of a plurality of rotors and stators to be coupled entails the fixed mounting of a first rotor to its shaft and the subsequent mechanical coupling thereto of additional rotors while the motors are maintained electromagnetically energized by a direct current source. Such coupling can be accomplished through any conventional means of joining shafts to transmit rotation, but in a preferred embodiment of the invention, coupling is effected by using a common shaft to which the rotors are coupled.

With not more than one rotor affixed to the common shaft, the remaining rotors to be coupled are mounted loosely so as to be freely rotatable on the common shaft. Direct current is then used to energize all the motors and the assembly is permitted to reach an equilibrium condition, which is achieved substantially instantaneously. The effect of energizing the motors with direct current is to swing all the rotors into precise electromagnetic polar alignment with their respective stators. While maintaining the assembly in an energized condition and, therefore, while maintaining precise polar alignment throughout the assembly, the loosely mounted rotors are secured to the common shaft by rotor locking means hereinafter described in greater detail. Thus, precise polar alignment is achieved throughout the assembly between all rotors and stators. This is a most advantageous feature and substantially critical when the assembly is to be used as a bi-directional stepper motor, for if an aligned rotor were to be coupled with an unaligned rotor, reversal of the energizing pulse would necessarily result in an unequal indexing, which is deleterious, in some cases even fatal, to the operation of a bi-directional stepper motor.

The essence of the present invention resides in the mechanical locking of rotatably mounted rotors on interconnected rotor shaft portions (e.g., a common rotor shaft) while the rotors are electromagnetically held in precise polar alignment. In the resulting assembly, all the rotors are in precise polar alignment with their respective stators before and after each and every "step" or indexing.

For a more complete understanding of the invention, reference should be made to the following description taken in conjunction with the accompanying drawing, in which:

FIG. 1 is a longitudinal view of a polarly aligned motor assembly according to the invention, partly in section;

FIG. 2 is an enlarged, fragmentary exploded view of a rotor receiving element and rotor locking means incorporated in the motor assembly of FIG. 1; and FIG. 3 is a schematic wiring diagram for achieving bi-directional indexing with the motor assembly of FIG. 1.

A motor assembly constituting a preferred embodiment of the invention, as illustrated in FIGS. 1 and 2, comprises a cup-shaped motor housing 10, a gear housing 11, a first motor sub-assembly A and a second motor sub-assembly B. The illustrated assembly is provided with a common rotor shaft 12 mounting a drive pinion 13 at its outer end.

The motor sub-assembly A typically may be a single phase, shaded-pole, inductor type synchronous motor of the type more fully described in pending United States patent applications Serial No. 571,632, filed March 15, 1956, Serial No. 798,199, filed March 9, 1959, and Serial No. 19,958, filed April 4, 1960, owned by the assignee of this application, comprising a coil assembly 14, a plurality of salient stator poles 15, and a rotor 16 mounted on a rotor hub 17. The rotor 16 of the illustrated sub-assembly is formed of a ferrite material and has induced therein a plurality of non-salient poles. The construction of the motor sub-assembly B is substantially identical to that of the sub-assembly A, with the principal exception that the rotor hub 18 differs from the rotor hub 17 in its size and in the stepping of its inside diameter. Also, the casing 19 of the second motor sub-assembly B differs slightly from the motor casing 20.

In the illustrated construction, the first motor casing 20 is secured to the gear housing 11 by means of the staked tabs 21, while the second motor casing 19 is secured to the first by suitable means, such as screws 22. The two motor sub-assemblies are retained in axial alignment by a flanged fitting 23, which also serves as a bearing housing for bearing 23' which supports the common rotor shaft 12. The rotor shaft 12, with the pinion 13 mounted at its forward end, also is supported by a forwarding bearing 24' mounted in the bearing housing 24.

Advantageously, the motor hub 17 carrying the rotor 16 of the first motor sub-assembly A, is mounted directly on and fixed to the shaft 12 by suitable means and the stepped rotor bushing 26 likewise is mounted on and fixed to the shaft 12 by suitable means. In accordance with the invention, the stepped rotor hub 18, carrying the rotor 28 of the second sub-assembly B, is loosely mounted on the mating, stepped rotor bushing 26. However, the second rotor 28 may be fixed rigidly to the bushing 26 (and therefore the shaft 12), by means of a nut 29 and lock washer 30, which are received over the threaded rearward end 26a of the bushing 26, as will be explained in more detail.

Where the motor assembly is intended for use as a bi-directional stepper motor, it is very advantageous to provide each of the motor coils, designated 14a, 14b in FIG. 3, with a center tap. Lead-in wires 31—33 are connected to the coil 14a and lead-in wires 34—36 are connected to the coil 14b as indicated, and the respective sets of lead-in wires are adapted to be connected (through suitable double-throw switches, for example) to energy sources. The arrangement is such that successive cycling operations of the pulsing switch for the motor sub-assembly A, for example, will cause the coil 14a thereof to be successively energized with alternate pulses of opposite polarity. The motor thus will index one "step" per half cycle of pulses in a desired direction. Stepping or indexing of the second motor sub-assembly B is effected in the same manner, but its direction of rotation, by design, is opposite to that of the first motor, so that the assembly will index "forward" or "backward" as desired.

As previously explained, it is very important (indeed critical in many instances) that the several motor sub-assemblies be in precise polar alignment, in the completed assembly, in order to achieve proper operation. In accordance with the invention, the desired, precise polar alignment is effected by mechanically locking the motor parts after first electromagnetically aligning each rotor with its stator and while maintaining such electromagnetic alignment.

Thus, with the first rotor 16 fixed to the common rotor shaft 12, and while the second rotor 28 is still loosely mounted on its bushing 26, direct current is applied to the motor sub-assembly A through its leads 31 and 33 and also to the sub-assembly B through its leads 34 and 36. This will draw the rotor 16 into electromagnetic polar alignment with its cooperating stator poles 15 and will also draw the loosely mounted rotor 28 into electromagnetic polar alignment with its cooperating stator poles. While keeping motor sub-assemblies A and B thus energized, and thereby maintaining precise electromagnetic polar alignment of rotors 16 and 28 with their respective stators, the stepped rotor hub 18 is locked to the common rotor shaft 12 in its polarly aligned position by tightening the lock nut 29 on the threaded bushing 26.

The motor assembly completed in accordance with the procedure of the invention is characterized by significantly improved performance characteristics and is advantageous for a variety of end uses. Thus, as heretofore mentioned, a bi-directional stepper motor assembly may be provided by utilizing a pair of motors designed for unidirectional rotation in opposite directions. In such an assembly, the precise polar alignment afforded by the practice of the invention reliably assures uniformity of the stepping or indexing increment, in either direction. In addition, the invention enables a plurality of self-starting synchronous, inductor type motors to be connected in mechanical series, for multiplication of output torques, with reliable starting and efficient performance being assured by the precise polar alignment of the several motors.

Another advantageous application of the motor assembly of the invention resides in the provision of an instantly reversible motor unit comprising a mechanically connected pair of self-starting, synchronous, inductor type motors designed for unidirectional rotation in opposite direction and adapted for alternative energization. Precise polar alignment of the respective motors of such an assembly is important for reliable self-starting in either direction.

The invention is particularly applicable for, although not necessarily limited to, motor assemblies in which certain motor elements are of non-salient pole construction. In such cases, polar alignment of the motor components by visual or mechanical means is virtually impossible. However, even with salient pole motor constructions, variations from motor to motor in dimensions or magnetic characteristics often will preclude reliably precise and uniform polar alignment by visual or mechanical systems.

Although the present invention has been described with reference to a specific, preferred embodiment, it should be understood that the disclosure has been made only by way of example and that certain changes in details of construction and in the combination and arrangement of steps and parts may be made without departing from the spirit and the scope of the invention as hereinafter claimed.

I claim:

1. The method of coupling with precise polar alignment an assembly of synchronous motors having rotor and stator elements, which comprises initially assembling said motors with at least one element of each motor in loosely coupled relation to an element of another motor, energizing all of the motors with direct current to electromagnetically effect precise polar alignment of the rotor and stator elements of each of the respective motors, rigidly coupling the loosely coupled elements while maintaining said motors in an energized condition, and thereafter de-energizing said motors.

2. The method of claim 1, in which the stator elements of each motor are initially rigidly coupled, the rotor elements are initially loosely coupled relative to each other, and said rotor elements are rigidly coupled together while maintaining said motors in an energized condition.

3. The method of claim 2, for coupling a motor assembly including a plurality of rotors mounted on a common shaft, in which at least certain of the rotor elements are initially loosely coupled to said shaft, and said certain rotor elements are rigidly coupled to said shaft while said motors are maintained in an energized condition.

4. The method of claim 3, in which one of said rotor elements is initially rigidly coupled to said shaft.

5. The method of coupling with precise polar alignment an assembly of synchronous motors having stators, rotors, and a common shaft, comprising the steps of fixedly mounting one of the plurality of said rotors on said shaft, rotatably mounting the additional rotors on said shaft in such manner that said additional rotors are freely rotatable with respect to said one rotor, energizing all said motors of said assembly with direct current to electromagnetically effect polar alignment of each rotor with its stator, mechanically securing said additional rotors to said shaft in their precise, polarly aligned equilibrium positions while maintaining all of the said motors in an energized condition, and subsequently de-energizing said motors.

6. A synchronous motor assembly comprising a plurality of electrically distinct synchronous motors, said synchronous motors comprised of rotors and stators, means securing said stators in fixed mutually non-rotatable relation to each other, and means coupling said rotors in fixed mutually non-rotatable relation and in electromagnetically oriented polar alignment with said stators.

7. A synchronous motor assembly according to claim 6 in which said means coupling said rotors in fixed mutually non-rotatable relation and in electromagnetically oriented polar alignment comprises a unitary common rotor shaft, and means securing said rotors to said shaft.

8. A synchronous motor assembly according to claim 7, in which rotor securing means for at least one of said rotors comprise an externally stepped bushing, said one rotor having a shouldered opening for close fitting reception of said bushing, said bushing having a projecting externally threaded portion, and a locking nut received on said threaded portion for locking said one rotor to said bushing.

9. A synchronous motor assembly according to claim 6, functional as a bi-directional stepper motor, in which said plurality of motors comprise two self-starting, unidirectional synchronous, single phase inductor type motors, one of said motors being designed for rotation in a clockwise direction when energized by a pulsating source, the other of said motors being designed for rotation in a counterclockwise direction when energized by a pulsating source.

10. A synchronous motor assembly according to claim 6, functional as a high torque synchronous motor, in which said plurality of synchronous motors, comprise unidirectional motors designed for rotation in the same direction.

11. A synchronous motor assembly according to claim 6, functional as an instantly reversible synchronous motor, in which said plurality of motors comprise two self-starting, unidirectional, synchronous, single phase inductor type motors, one of said motors being designed to rotate in a clockwise direction when energized by an alternating source, and the other being designed to rotate in a counterclockwise direction when energized by an alternating source.

References Cited in the file of this patent

UNITED STATES PATENTS 2,524,361    Sawyer et al. _____ Oct. 3, 1950